US008812490B1

(12) United States Patent
Cappiello et al.

(10) Patent No.: US 8,812,490 B1
(45) Date of Patent: Aug. 19, 2014

(54) DATA SOURCE JOINS

(75) Inventors: Scott Cappiello, San Marcos, CA (US); Gang Liang, Fairfax, VA (US); Xun Feng, Great Falls, VA (US); Jun Yuan, Great Falls, VA (US); Benjamin Z. Li, McLean, VA (US); Rixin Liao, Herndon, VA (US)

(73) Assignee: MicroStrategy Incorporated, Vienna, VA (US)

( * ) Notice: Subject to any disclaimer, the term of this patent is extended or adjusted under 35 U.S.C. 154(b) by 440 days.

(21) Appl. No.: 12/915,752

(22) Filed: Oct. 29, 2010

Related U.S. Application Data

(60) Provisional application No. 61/256,563, filed on Oct. 30, 2009.

(51) Int. Cl.
*G06F 7/00* (2006.01)
*G06F 17/30* (2006.01)

(52) U.S. Cl.
USPC ............ 707/719; 707/718; 707/717; 707/714

(58) Field of Classification Search
None
See application file for complete search history.

(56) References Cited

U.S. PATENT DOCUMENTS

| | | | |
|---|---|---|---|
| 8,396,961 B2 * | 3/2013 | Little | 709/224 |
| 2003/0154406 A1 * | 8/2003 | Honarvar et al. | 713/201 |
| 2006/0074858 A1 * | 4/2006 | Etzold et al. | 707/3 |
| 2007/0162425 A1 * | 7/2007 | Betawadkar-Norwood et al. | 707/2 |
| 2007/0203893 A1 * | 8/2007 | Krinsky et al. | 707/3 |
| 2007/0226178 A1 * | 9/2007 | Ewen et al. | 707/2 |
| 2008/0126333 A1 * | 5/2008 | Bezar et al. | 707/5 |
| 2008/0222311 A1 * | 9/2008 | Lee et al. | 710/6 |
| 2009/0030896 A1 * | 1/2009 | Jensen et al. | 707/5 |
| 2009/0138371 A1 * | 5/2009 | McGee | 705/26 |
| 2009/0150401 A1 * | 6/2009 | Allen et al. | 707/10 |
| 2009/0171889 A1 * | 7/2009 | Friedlander et al. | 707/2 |
| 2009/0177697 A1 * | 7/2009 | Gao et al. | 707/104.1 |
| 2009/0234815 A1 * | 9/2009 | Boerries et al. | 707/3 |
| 2009/0327416 A1 * | 12/2009 | Mankovski | 709/204 |
| 2010/0082671 A1 * | 4/2010 | Li et al. | 707/770 |

* cited by examiner

*Primary Examiner* — Dung K Chau
(74) *Attorney, Agent, or Firm* — Fish & Richardson P.C.

(57) ABSTRACT

Database report generation technology for handling a single logical query that requires data that is physically located in two different sources. The system uses intelligent push-down joins, which move data from one source to the other and join data within that source. The system dynamically determines which direction to move data depending on how the data is used in a query.

23 Claims, 10 Drawing Sheets

DATA SOURCE JOINS

CROSS REFERENCE TO RELATED APPLICATIONS

The present application claims priority to U.S. Provisional Application No. 61/256,563, filed Oct. 30, 2009, which is incorporated herein by reference in its entirety for all purposes.

TECHNICAL FIELD

This disclosure relates to data source join technology.

BACKGROUND

Computer systems are used to manage and store data. As such, they may be used to analyze data and generate reports based on the analysis results. For instance, computer systems may filter data and calculate metric values based on the filtered data, ultimately providing a report including the calculated metric values.

SUMMARY

In one aspect, this disclosure relates to data source join technology.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

DETAILED DESCRIPTION

Techniques are described for handling a single logical query that requires data that is physically located in two different sources. The system uses intelligent push-down joins, which move data from one source to the other and join data within that source. The system dynamically determines which direction to move data depending on how the data is used in a query.

Figure 1:
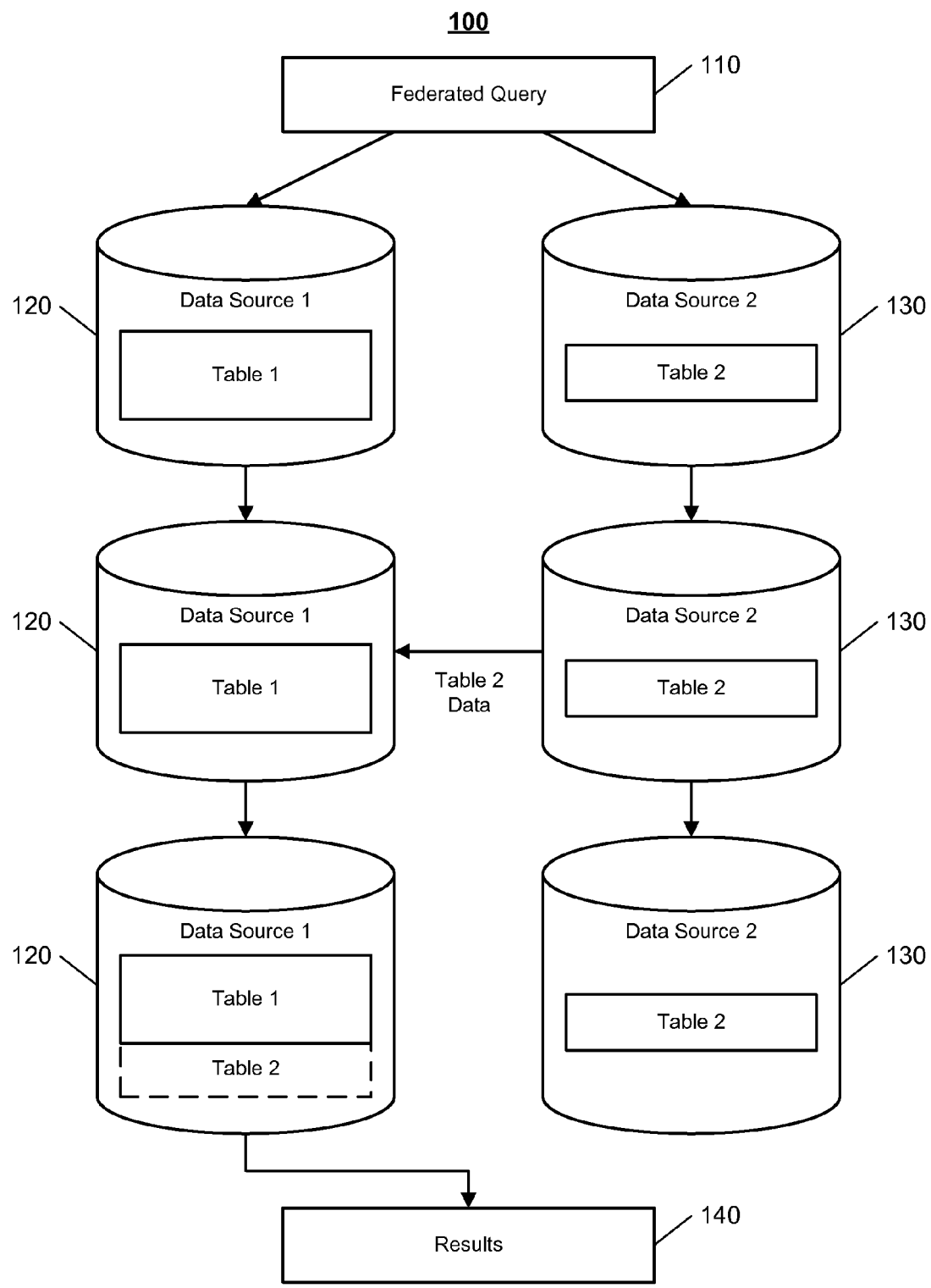
FIGS. 1, 6, 7, and 9 are diagrams of example query processing.

FIG. 1 illustrates an example 100 for handling a query. The example 100 is described as being performed by a system. In the example 100, the system receives a federated query 110. For example, the system may receive the federated query through user input provided by a user to a graphical user interface displayed by the system. A federated query is a query that requires searching of multiple, different data sources to produce a result. In the example 100, the received query requires searching of a first data source 120 and a second data source 130.

When the system receives the federated query, the system determines that the federated query requires data from the first data source 120 and the second data source 130. Specifically, the system determines that, to resolve the federated query, the system needs to search Table 1 included in the first data source 120 and Table 2 included in the second data source 130.

In response to determining that the federated query requires data from the first data source 120 and the second data source 130, the system analyzes the required data from the first data source 120 and the required data from the second data source 130 to make an intelligent decision as to a location of where to join the data to enable execution of the federated query. For example, the system determines a first size of the data stored in Table 1 included in the first data source 120 and a second size of the data stored in Table 2 included in the second data source 130. In this example, the system compares the first size to the second size and determines that the size of the data needed from the second data source 130 is less than the size of the data needed from the first data source 120.

In response to the determination that the size of the data needed from the second data source 130 is less than the size of the data needed from the first data source 120, the system determines to join the data needed for satisfaction of the federated query in the first data source 120. Accordingly, the system moves the data needed from the second data source 130 to the first data source 120. For instance, the system moves the data included in Table 2 to the first data source 120.

After moving the data needed from the second data source 130 to the first data source 120, the system joins the moved data from the second data source 130 with the data needed from the first data source 120. For example, the system joins the Table 2 data with Table 1 in the first data source 120. In joining the Table 2 data with Table 1 in the first data source 120, the system may create a new database table in the first data source 120 that includes a combination of Table 1 and Table 2.

After joining the Table 2 data with Table 1 in the first data source 120, the system executes the query against the joined data in the first data source 120. For instance, the system may execute the query against the new database table in the first data source 120 that includes a combination of Table 1 and Table 2.

Based on the execution of the query, the system provides results 140 of execution of the query. The results may include a list of matching records and/or a report that includes statistical processing of data identified as matching the query. The system may display the results to a user using a graphical user interface, may store the results in electronic storage, and/or may send the results to the user in an electronic communication over a network (e.g., a report attached to an electronic mail message).

In providing the results to the query, the system only needs to extract and move data from the second data source 130, as the data from the first data source 120 remains in the first data source 120 throughout execution of the query. Because the data from the first data source 120 does not need to be extracted and represents a larger portion of the data needed for satisfaction of the query, the system may increase the processing speed of providing results in response to the query, as compared to systems that join data in a separate location (e.g., memory) that is different than the data sources that store the underlying data needed for satisfaction of the query.

Figure 2:
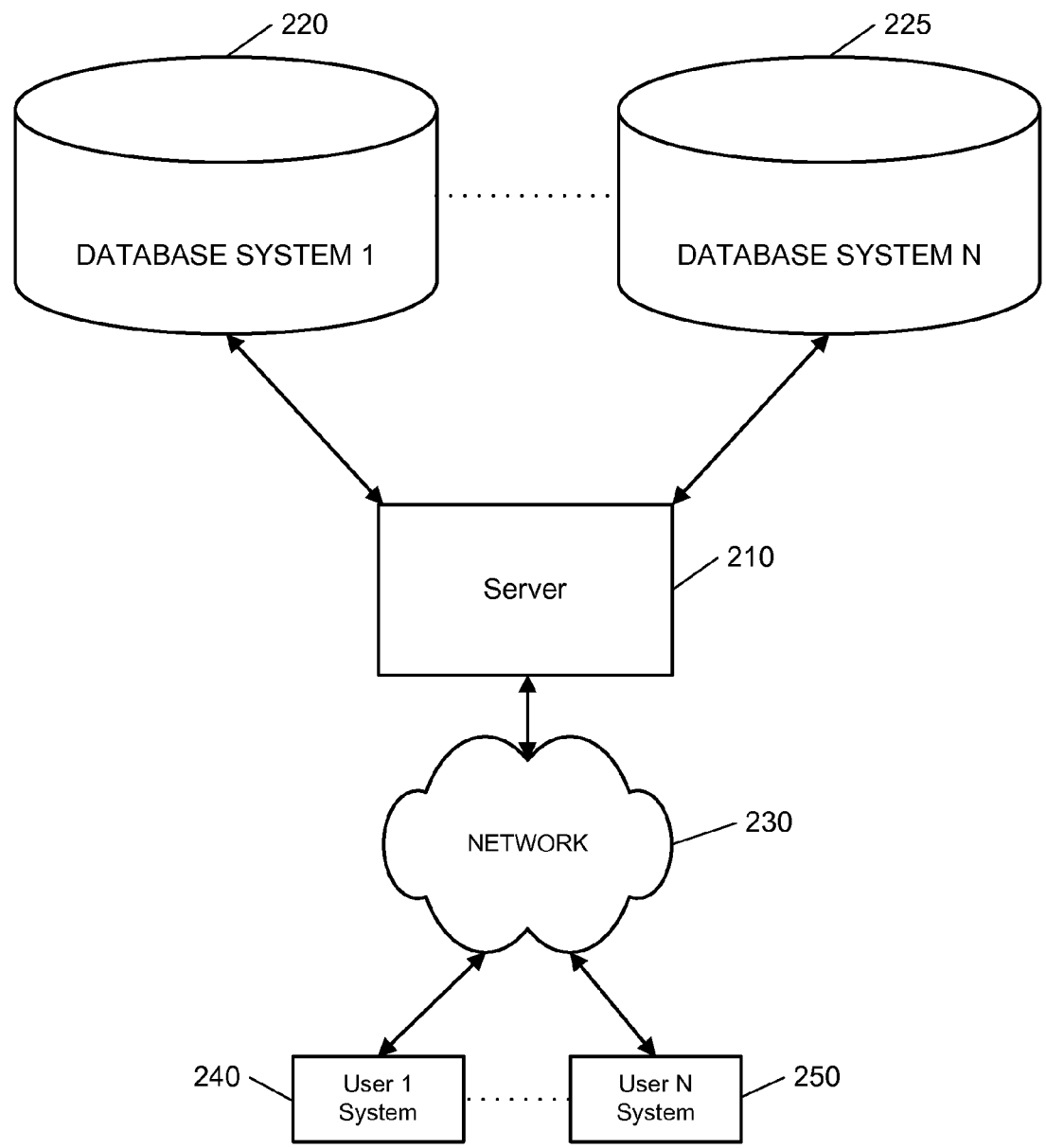
FIGS. 2 and 10 are diagrams of example systems.

FIG. 2 illustrates an example system 200 for report generation. The system 200 includes a server 210, a first database system 220, an nth database system 225, a network 230, and multiple user systems 240 and 250. The network 230 enables the server 210 and the multiple user systems 240 and 250 to exchange electronic communications. The server 210 is an electronic device configured to execute programs, access data from the database systems 220 and 225, and exchange communications with the multiple user systems 240 and 250 over the network 230.

The first database system 220 is an electronic device configured to store data and exchange communications with the server 210 (e.g., multiple servers or computers) over a direct connection or network. For example, the first database system 220 may be configured to store an organization's data and output the organization's data in response to requests (e.g., SQL statements or queries). In this example, the first database system 220 may exchange communications with the server 210 to receive input defining data needed from the first database system 220 and provide the data needed as output to the server 210. The first database system 220 may include one or more databases and/or data warehouses.

The nth database system 225 is similar to the first database system 220. The nth database system 225 may store part of an organization's data and output the organization's data in response to requests (e.g., SQL statements or queries). The first database system 220 and the nth database system 225 may together store all of the organization's data. Although FIG. 2 illustrates two database systems for brevity, actual implementations may include more (and, perhaps, many more) database systems.

The network 230 is configured to enable exchange of electronic communications between devices connected to the network 230. For example, the network 230 may be configured to enable exchange of electronic communications between the server 210 and the multiple user systems 240 and 250. The network 230 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (DSL)), radio, television, cable, satellite, or any other delivery or tunneling mechanism for carrying data. Network 230 may include multiple networks or subnetworks, each of which may include, for example, a wired or wireless data pathway. The network 230 may include a circuit-switched network, a packet-switched data network, or any other network able to carry electronic communications. For example, the network 230 may include networks based on the Internet protocol (IP) or asynchronous transfer mode (ATM).

The multiple user systems 240 and 250 each may be a general-purpose computer (e.g., a desktop personal computer, a workstation, or a laptop computer) that is configured to communicate with the server 210 over the network 230. Users of the user systems 240 and 250 may submit data requests to the server 210 over the network 230. For example, data requests may be associated with a query, such as a query used as the basis for a report. The server 210 may execute at least a portion of the query against data in the first database system 220 and/or data in the nth database system 225.

In some implementations, the multiple user systems 240 and 250 may be mobile or wireless devices or devices designed for a specific function. For example, the multiple user systems 240 and 250 may include a cell phone, a smart phone, a tablet PC, a personal digital assistant ("PDA"), or any other portable device configured to communicate over a network and display information. Although FIG. 2 illustrates two user systems for brevity, actual implementations may include more (and, perhaps, many more) user systems.

Figure 3:
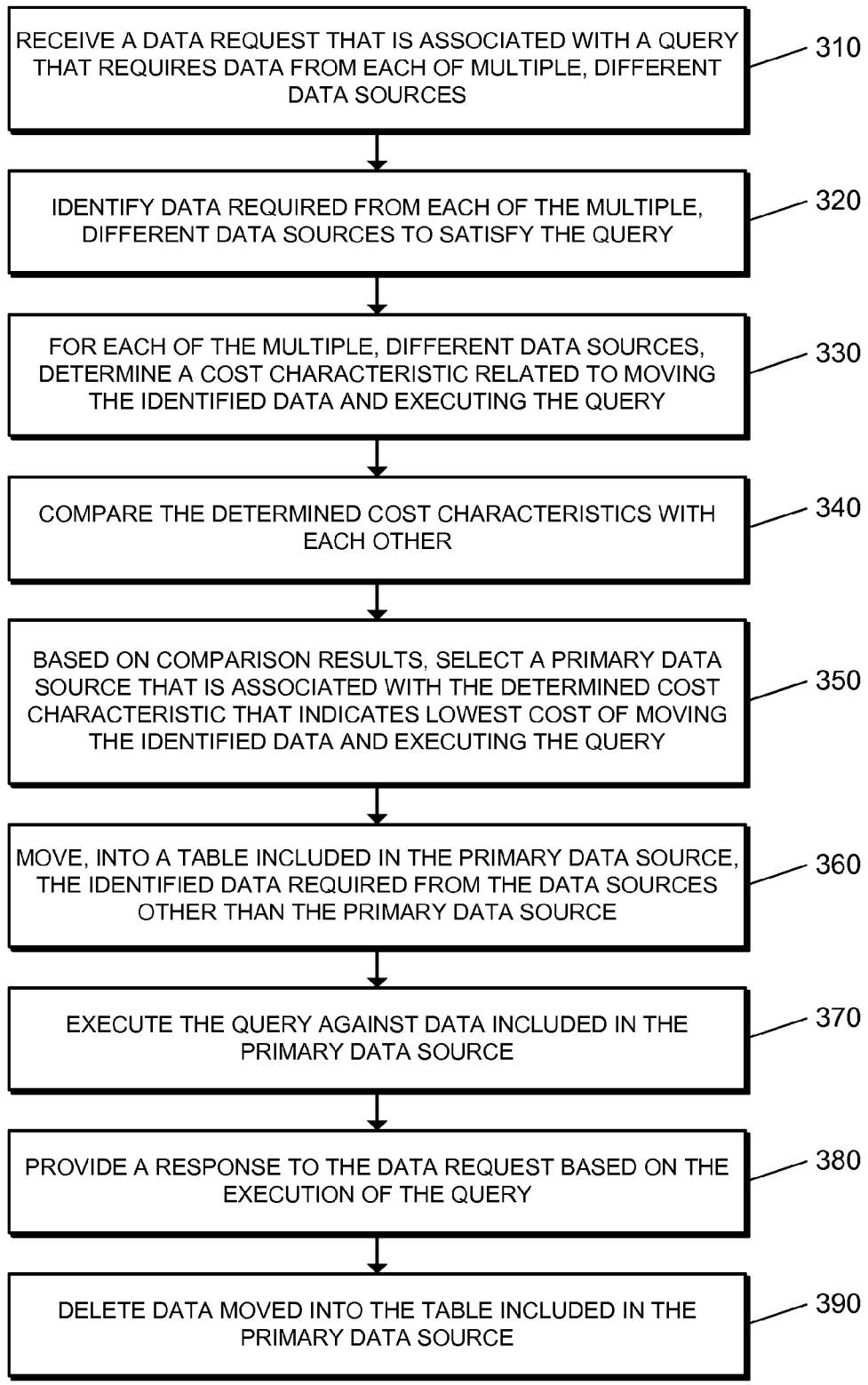
FIGS. 3, 5, and 8 are flowcharts of example processes.

FIG. 3 illustrates an example process 300 for handling a data request. The operations of the process 300 are described generally as being performed by the system 200. The operations of the process 300 may be performed one of the components of the system 200 or may be performed by a combination of the components of the system 200. In some implementations, operations of the process 300 may be performed by one or more processors included in one or more electronic devices.

The system 200 receives a data request that is associated with a query that requires data from each of multiple, different data sources (310). For example, the server 210 may receive a data request associated with a query from the user system 240 or the user system 250 over the network 230. The query may be the basis for a report. For example, a report may be based on a pre-defined query that is defined when a report definition is created. A query may be "hard-coded," where all code of the query is specified when the query is defined, or a query may be a "prompted," or "parameter" query, where parts of the query code are filled-in when the query is executed in response to a user's answers to one or more prompts.

Other types of queries may be associated with the data request. For example, the data request may be associated with a query that is included as part of executable computer program code (e.g., the query may be embedded into or otherwise included in the computer program code), and the data request may be received when the computer program code is executed. As another example, the query may be an "ad hoc" query. For example, an ad hoc query may be entered interactively by an analyst in a user interface. As yet another example, a query may be a "drilling" query, where an analyst "drills down" from summary information to more detailed information.

In some implementations, the system 200 receives a query that requires data from each of multiple, physically independent data sources that are located remotely from one another. The system 200 may receive a query directly that requires data from each of multiple, different data sources. The system 200 also may receive a report generation request that requires execution of a query that requires data from each of multiple, different data sources to gather data required to generate the report.

The system 200 identifies data required from each of the multiple, different data sources to satisfy the query (320). For instance, the system 200 analyzes the query to identify the data sources that store data needed for execution of the query. Once the system 200 has identified the data sources that store data needed for execution of the query, the system 200 analyzes the query to identify the data within each of the identified data sources that is needed for execution of the query. For example, the system 200 may identify, within each data source, one or more data structures (e.g., tables, cubes, etc.) that are needed for execution of the query.

For each of the multiple, different data sources, the system 200 determines a cost characteristic related to moving the identified data and executing the query (330). The system 200 may account for a combination of many factors in determining the cost characteristic. The cost characteristic may relate to a time needed to perform execution of the received query when the corresponding data source is chosen as the source where all of the data needed for execution of the query is joined. The cost characteristic may account for the time needed to move the necessary data to the corresponding data source, the time needed to join the data within the corresponding data source, and the time needed to execute the query against the joined data within the corresponding data source. The determined cost characteristics may vary based on the size of the data that needs to be transferred, how close various data sources are located to one another, the data access speed at which a data source can access and store data, the transmission speed at which a data source can send and receive data, the processing speed at which a data source can join data and execute a query, the current utilization of the data source, and any other factors that contribute to the time needed to join data and perform execution of a query.

For instance, the system 200 may determine a storage size of the identified data for each data source and use the storage size as at least a part of the cost characteristic. In addition, the system 200 may determine estimated data access times for each data source, estimated data transmission times between the various data sources, and/or estimated query execution times for each data source. The system 200 may use the estimated data access times, the estimated data transmission times, and/or the estimated query execution times as at least a part of the cost characteristic.

In some examples, the system 200 considers whether a table of data needed from a data source is a temporary table or a permanent table in determining the cost characteristic. In these examples, the system 200 may determine whether data required from a first data source to satisfy the query is stored in a temporary table and whether data required from a second, different data source to satisfy the query is stored in a temporary table. The system 200 may adjust the cost characteristic based on the determination of whether the data needed from a data source is stored in a permanent or a temporary table. For instance, when the data needed from a data source is stored in a permanent table, the system 200 may adjust the cost characteristic to increase the chance of the data source being selected as the data source where data needed for execution of the query is joined, as it is likely more time consuming (as compared to temporary tables) to transfer data from the data source to another data source because the permanent table likely has more data than a typical temporary table. When the data needed from a data source is stored in a temporary table, the system 200 may adjust the cost characteristic to decrease the chance of the data source being selected as the data source where data needed for execution of the query is joined, as it is likely less time consuming (as compared to permanent tables) to transfer data from the data source to another data source because the temporary table likely has less data than a typical permanent table.

In some implementations, the system 200 considers time period of existence of a table in determining the cost characteristic. In these implementations, the system 200 may determine a first time period of existence of a first table including data required from a first data source to satisfy the query and a second time period of existence of a second table including data required from a second, different data source to satisfy the query. The system 200 may adjust the cost characteristic based on the determined time period of existence. For instance, when a table has been in existence for a relatively long period of time, the system 200 may adjust the cost characteristic to increase the chance of the data source being selected as the data source where data needed for execution of the query is joined, as it is likely more time consuming (as compared to a table with a shorter existence) to transfer data from the data source to another data source because the table likely has more data than a typical table that has been in existence for a shorter period of time. When a table has been in existence for a relatively short period of time, the system 200 may adjust the cost characteristic to decrease the chance of the data source being selected as the data source where data needed for execution of the query is joined, as it is likely less time consuming (as compared to a table with a longer existence) to transfer data from the data source to another data source because the table likely has less data than a typical table that has been in existence for a longer period of time.

Further, the system 200 may consider database access and transfer time in determining the cost characteristic. For instance, the system 200 may determine, for each of the multiple, different data sources, a time needed to access and transfer the identified data required from the multiple, different data sources other than the corresponding data source. The system 200 may estimate a data access rate for a particular data source, determine an amount of data needed from the particular data source, and estimate a data transmission rate for transmitting data from the particular data source to the corresponding data source for which the cost characteristic is being determined. The system 200 then may compute a data access time using the estimated data access rate and the determined amount of data and compute a data transmission time using the estimated data transmission rate and the determined amount of data. The system 200 may use the computed data access time and/or the computed data transmission time as at least a part of the cost characteristic.

In addition, the system 200 may consider query execution time in determining the cost characteristic. For instance, the system 200 may determine, for each of the multiple, different data sources, a time needed to execute the query using the corresponding data source. The query execution time may account for the processing speed of a system that executes queries against the corresponding data source and the amount of data that needs to be processed in evaluating the query. The system 200 may use the time needed to execute the query as at least a part of the cost characteristic.

In some examples, the system 200 may account for current usage of each of the multiple, different data sources in determining cost characteristics. In these examples, the system 200 may determine a current bandwidth and load of each of the multiple, different data sources and use the current bandwidth and load as at least a part of the cost characteristic.

In some implementations, the system 200 may consider costs other than time in determining cost characteristics. In these implementations, the system 200 may determine, for each of the multiple, different data sources, a cost characteristic based on monetary fees associated with moving, to the corresponding data source, the identified data required from the multiple, different data sources other than the corresponding data source and executing the query at the corresponding data source. The system 200 may determine the monetary fees based on data access costs when data sources under consideration charge access fees for accessing data. The system 200 may determine the monetary fees based on energy costs associated with accessing and transferring data to and from a data source and executing a query at the data source. The system 200 may use the cost characteristic based on monetary fees as at least a part of the cost characteristic.

The system 200 compares the determined cost characteristics with each other (340). For example, the system 200 compares the determined cost characteristics with each other to identify the cost characteristic that indicates a lowest cost for executing the query. In this example, the system 200 may order the cost characteristics or search the cost characteristics to identify a lowest cost characteristic. The system 200 may consider one cost characteristic for each data source or may consider a number of different cost characteristics for each data source.

When the cost characteristic considers whether a table of data needed from a data source is a temporary table or a permanent table, the system 200 may compare the determination of whether a table of data needed from a first data source is a temporary table or a permanent table with the determination of whether a table of data needed from a second data source is a temporary table or a permanent table. For instance, the system 200 may determine whether data from both the first data source and the second data source is stored in a temporary table, whether data from both the first data source and the second data source is stored in a permanent table, whether data from the first data source is stored in a temporary table and data from the second data source is stored in a permanent table, or whether data from the first data source is stored in a permanent table and data from the second data source is stored in a temporary table.

When the cost characteristic considers time period of existence of a table, the system 200 may compare a first time period of existence for a first table of data needed from a first data source with a second time period of existence for a second table of data needed from a second data source. The system 200 may determine whether or not the first table has been in existence longer than the second table.

When the cost characteristic considers database access and transfer time, the system 200 may compare a first database access and transfer time for data needed from a first data source with a second database access and transfer time for data needed from a second data source. The system 200 may determine whether it is faster to access the data needed from the first data source and transfer it to the second data source or faster to access the data needed from the second data source and transfer it to the first data source.

When the cost characteristic considers query execution time, the system 200 may compare a first query execution time for a first data source with a second query execution time for a second data source. The system 200 may determine whether it is faster to execute the query at the first data source or faster to execute the query at the second data source.

Based on comparison results, the system 200 selects a primary data source that is associated with the determined cost characteristic that indicates lowest cost of moving the identified data and executing the query (350). For instance, the system 200 intelligently selects, as the primary data source, the data source that allows for fastest execution of the query. The system 200 may perform the selection based on a comparison a single cost characteristic or a comparison of a combination of the cost characteristics described throughout this disclosure.

In some examples, when the cost characteristic considers whether a table of data needed from a data source is a temporary table or a permanent table, the system 200 selects a first data source as the primary source to receive data from a second data source when the comparison reveals that the data required from the first data source to satisfy the query is not stored in a temporary table and the data required from the second data source to satisfy the query is stored in a temporary table. In these examples, the system 200 selects the second data source as the primary source to receive data from the first data source when the comparison reveals that the data required from the second data source to satisfy the query is not stored in a temporary table and the data required from the first data source to satisfy the query is stored in a temporary table. When the system 200 determines that the data required from the first data source to satisfy the query and the data required from the second data source to satisfy the query are both stored in a same type of table (e.g., both stored in a temporary table or both stored in a permanent table), the system 200 uses a comparison of other cost characteristics to determine whether to select the first data source or the second data source as the primary data source.

In some implementations, when the cost characteristic considers time period of existence of a table, the system 200 may select a first data source as the primary source to receive data from a second data source when the comparison reveals that a first time period of existence associated with the first data source is longer than a second time period of existence associated with the second data source. In these implementations, the system 200 may select the second data source as the primary source to receive data from the first data source when the comparison reveals that the second time period of existence associated with the second data source is longer than the first time period of existence associated with the first data source.

Further, when the cost characteristic considers database access and transfer time, the system 200 may select, from among the multiple, different data sources, a primary data source that has lowest time needed to access and transfer the identified data required from the multiple, different data sources other than the primary data source. When the cost characteristic considers query execution time, the system 200 may select, from among the multiple, different data sources, a primary data source that has lowest time needed to execute the query using the primary data source.

The system 200 moves, into a table included in the primary data source, the identified data required from the data sources other than the primary data source (360). For example, the system 200 may join, in the primary data source, the identified data required from the multiple, different data sources other than the primary data source with the identified data required from the primary data source. In this example, the system 200 may join the data from the other data sources with an existing table in the primary data source or may create a new table in the primary data source based on the selection of the primary data source.

The system 200 executes the query against data included in the primary data source (370). For instance, the system 200 executes the query against the joined data in the primary data source. The system 200 may generate code (e.g., structured query language (SQL) code) for the query and apply the generated code to the primary data source.

In some examples, the system 200 may analyze the query only against physical data storage of the primary data source. The system 200 also may analyze the query against physical data storage of the primary data source without analyzing the query against physical data storage of any of the multiple, different data sources other than the primary data source.

The system 200 provides a response to the data request based on the execution of the query (380). For instance, the system 200 may generate a report that includes the result of execution of the query and statistical analysis of the result. The report may include information identifying the type of report generated, computations made on accessed metrics, and identifiers associated with the computed metrics that identify to which group of attribute classes the computed metric belongs. The report may be stored in electronic storage, displayed on any type of display device, and/or communicated over a network to another device. The system 200 also may directly provide the result of execution of the query.

The system 200 deletes data moved into the table included in the primary data source (390). For instance, when the system 200 creates a new table in the primary data source to join the data, the system 200 deletes the new table created in the primary data source. When the system 200 joins the data from other sources in an existing table in the primary data source, the system 200 removes the data from other sources and maintains the existing table in the primary data source in its prior state.

In some implementations, rather than deleting the data moved into the table included in the primary data source, the system 200 maintains the data in the primary data source. In these implementations, the system 200 may execute subsequent queries using the data maintained in the primary data source without having to transfer and join data from other data sources. The system 200 may perform data synchronization and/or data migration operations to ensure the data maintained in the primary data source and the data from the other data sources stays up to date and accurate.

Figure 4:
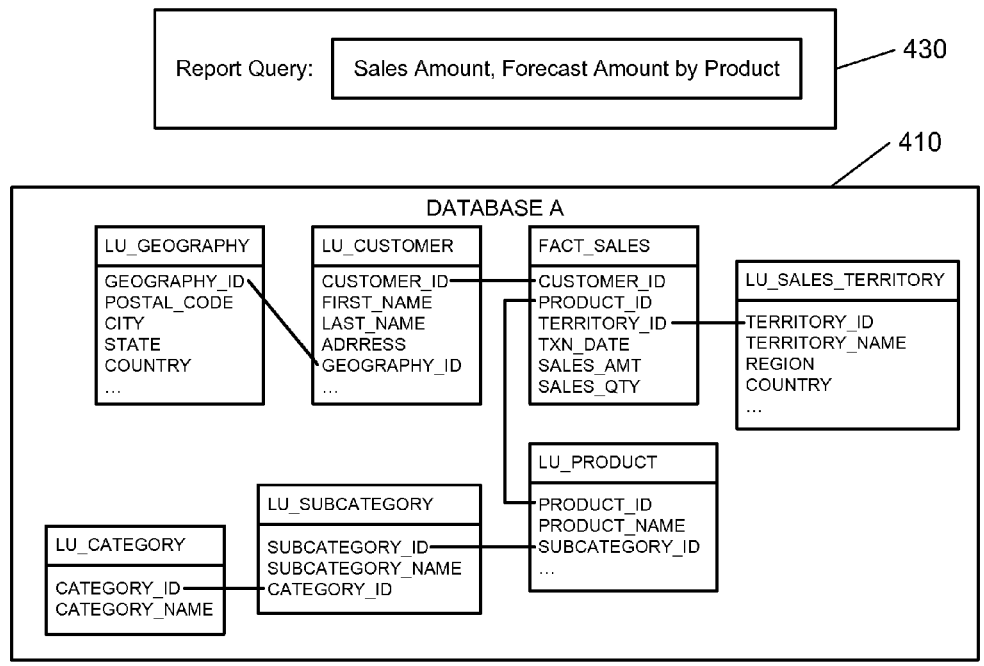
FIG. 4 is a diagram of example databases.
Figure 4:
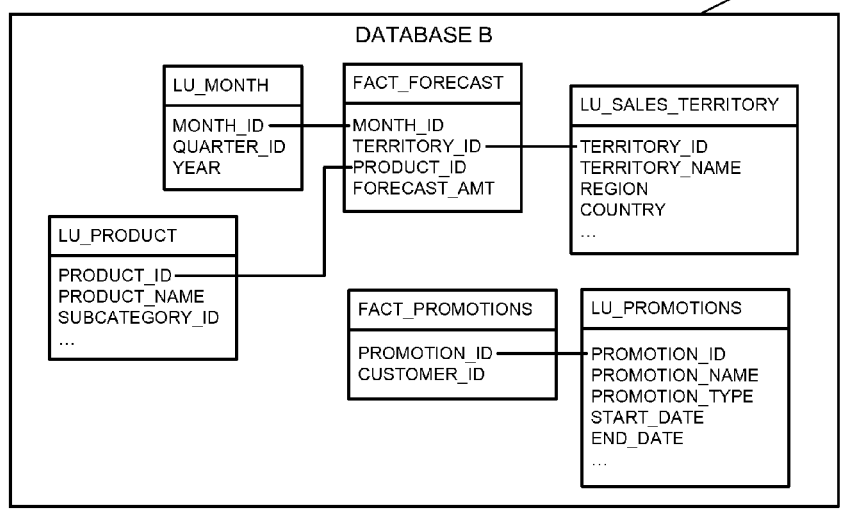

FIG. 4 illustrates example databases 400. The example databases 400 include a first database 410 and a second database 420. The first database 410 includes actual sales data and the second database 420 includes forecast data and promotions data. The second database 420 includes replicated lookup tables for product and sales territory. Lookups for category, subcategory, geography, customer are only in the first database 410 and a lookup for promotions is only in the second database 420. When a report query 430 is received that requires data from both the first database 410 and the second database 420, a join of data from the first database 410 and data from the second database 420 is performed. For example, the report query 430 requires actual sales data from the first database 410 and forecast data from the second database 420. In this example, the actual sales data from the first database 410 is joined with the forecast data from the second database 420 and the report query 430 is executed. The actual sales data from the first database 410 may be joined with the forecast data from the second database 420 using any of the techniques described throughout this disclosure.

Figure 5:
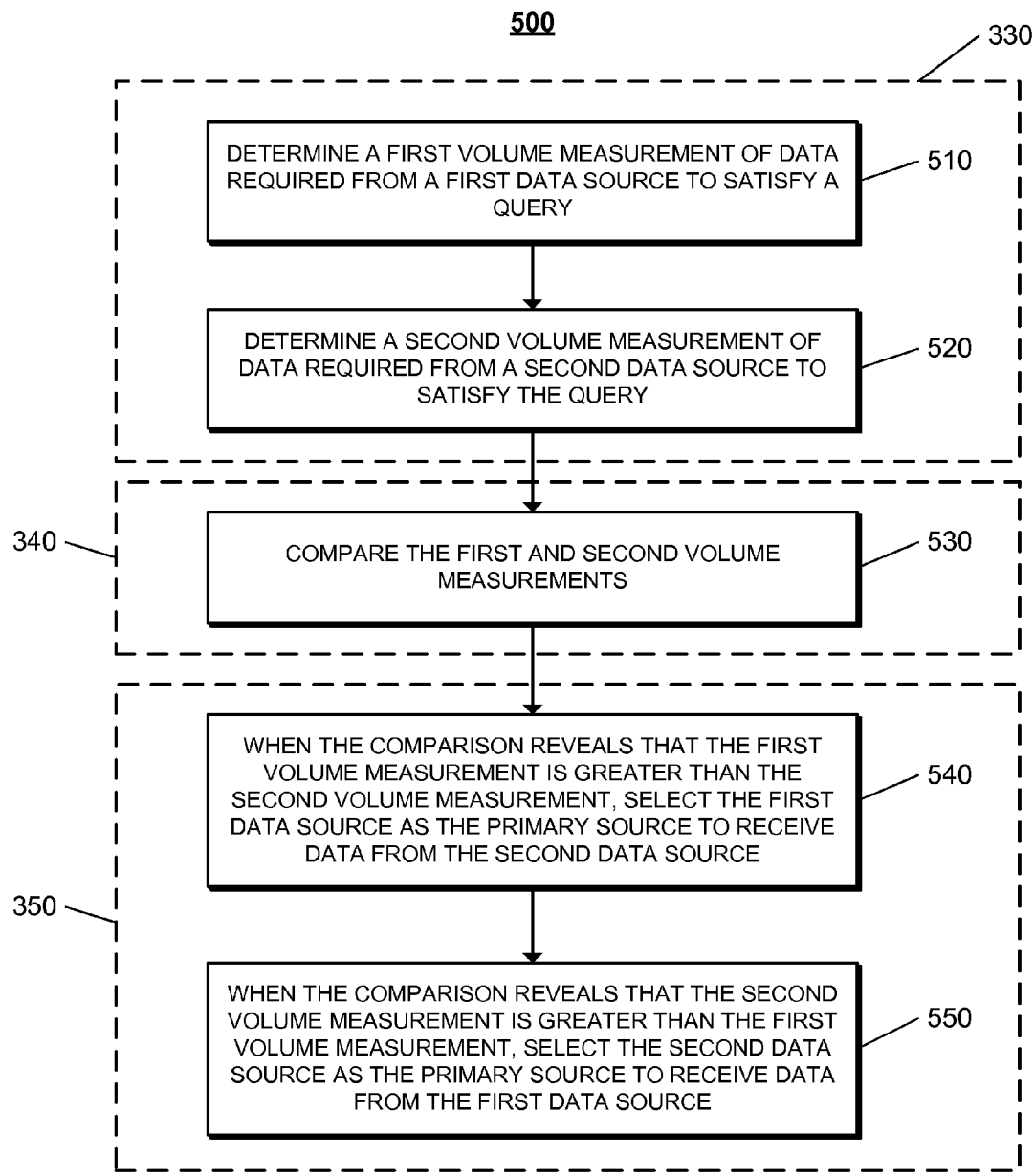

FIG. 5 illustrates an example process 500 for selecting a primary data source. The process 500 describes in additional detail some of the operations of the process 300 described above in reference to FIG. 3. For example, operations 510 and 520 described below may be used in determining a cost characteristic related to moving the identified data and executing the query referenced above with respect to reference numeral 330. Operation 530 may be used in comparing the determined cost characteristics referenced above with respect to reference numeral 340. Operations 540 and 550 described below may be used in selecting a primary data source referenced above with respect to reference numeral 350.

The operations of the process 500 are described generally as being performed by the system 200. The operations of the process 500 may be performed one of the components of the system 200 or may be performed by a combination of the components of the system 200. In some implementations, operations of the process 500 may be performed by one or more processors included in one or more electronic devices.

The system 200 determines a first volume measurement of data required from a first data source to satisfy a query (510). For instance, the system 200 determines a size of a table needed from the first data source to satisfy the query. The first volume measurement may be a storage size in terms of a number of bytes needed to store the data required from the first data source. The first volume measurement also may be a number rows in a database table or a number of data objects required from the first data source.

The system 200 determines a second volume measurement of data required from a second data source to satisfy the query (520). For instance, the system 200 determines a size of a table needed from the second data source to satisfy the query. The second volume measurement may be a storage size in terms of a number of bytes needed to store the data required from the second data source. The second volume measurement also may be a number rows in a database table or a number of data objects required from the second data source.

The system 200 compares the first and second volume measurements (530). For instance, the system 200 determines whether or not the first volume measurement is larger than the second volume measurement.

When the comparison reveals that the first volume measurement is greater than the second volume measurement, the system 200 selects the first data source as the primary source to receive data from the second data source (540). The system 200 selects the first data source as the primary source because the first data source has more data needed to satisfy the query than the second data source and, as such, it would likely take more time to transfer the data needed from the first data source to the second data source than to transfer the data needed from the second data source to the first data source.

When the comparison reveals that the second volume measurement is greater than the first volume measurement, the system 200 selects the second data source as the primary source to receive data from the first data source (550). The system 200 selects the second data source as the primary source because the second data source has more data needed to satisfy the query than the first data source and, as such, it would likely take more time to transfer the data needed from the second data source to the first data source than to transfer the data needed from the first data source to the second data source.

Figure 6:
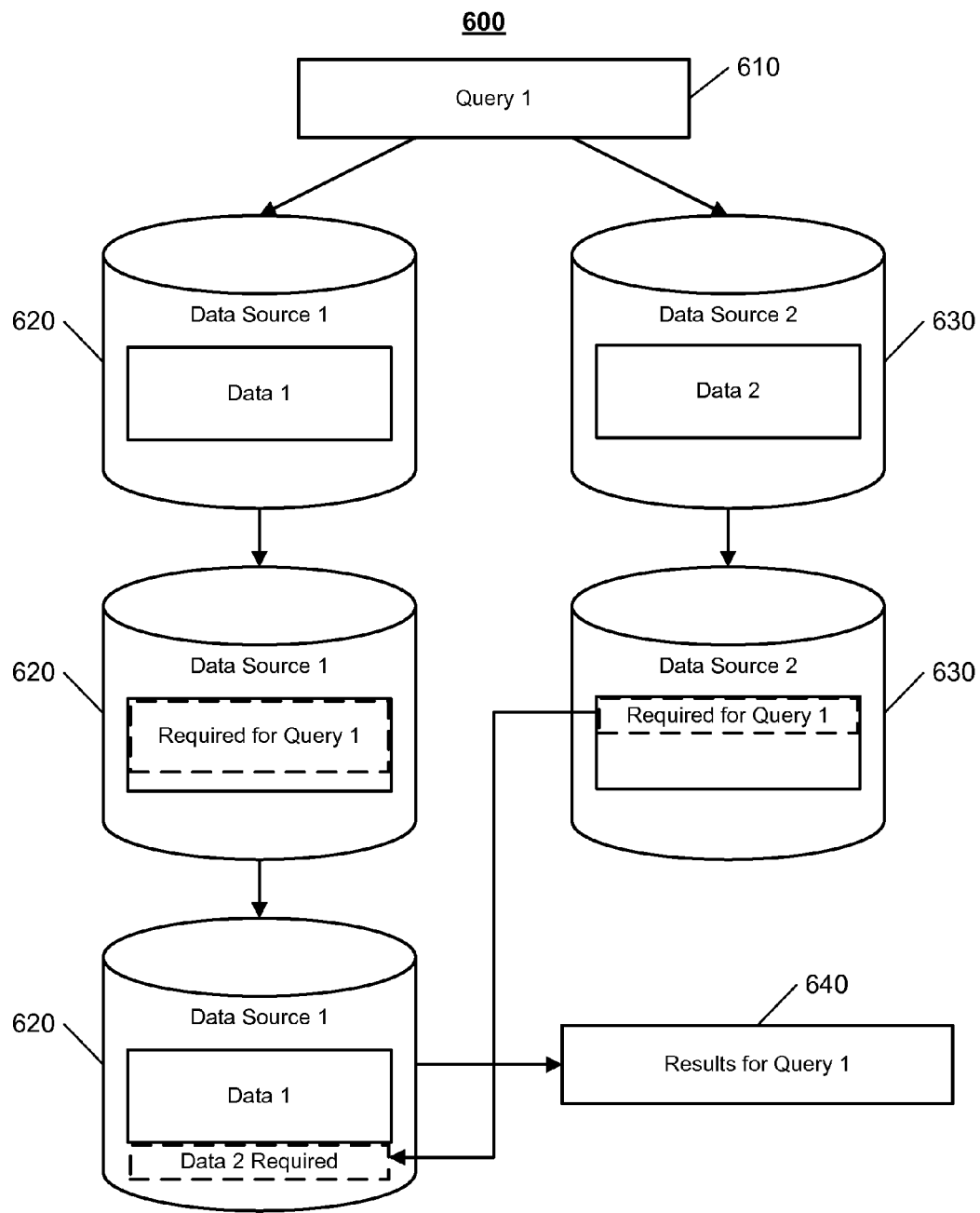

FIG. 6 illustrates an example 600 for handling a first query using the process 500. The system 200 receives a first query 610. In the example 600, the first query requires searching of a first data source 620 and a second data source 630.

When the system 200 receives the first query, the system 200 determines that the first query requires data from the first data source 620 and the second data source 630. In response to determining that the first query requires data from the first data source 620 and the second data source 630, the system 200 determines a first size of the data needed from the first data source 620 and a second size of the data needed from the second data source 630. In this example, the system 200 compares the first size to the second size and determines that the size of the data needed from the second data source 630 is less than the size of the data needed from the first data source 620.

In response to the determination that the size of the data needed from the second data source 630 is less than the size of the data needed from the first data source 620, the system 200 determines to join the data needed for satisfaction of the first query in the first data source 620. Accordingly, the system moves the data needed from the second data source 630 to the first data source 620.

After moving the data needed from the second data source 630 to the first data source 620, the system 200 joins the moved data from the second data source 630 with the data needed from the first data source 620. In joining the data in the first data source 620, the system 200 may create a new database table in the first data source 620 that includes a combination of the data needed from the first data source 620 and the data needed from the second data source 630.

After joining the data in the first data source 620, the system 200 executes the first query against the joined data in the first data source 620. Based on the execution of the first query, the system 200 provides results 640 of execution of the first query. The results may include a list of matching records and/or a report that includes statistical processing of data identified as matching the query. The system may display the results to a user using a graphical user interface, may store the results in electronic storage, and/or may send the results to the user in an electronic communication over a network (e.g., a report attached to an electronic mail message).

Figure 7:
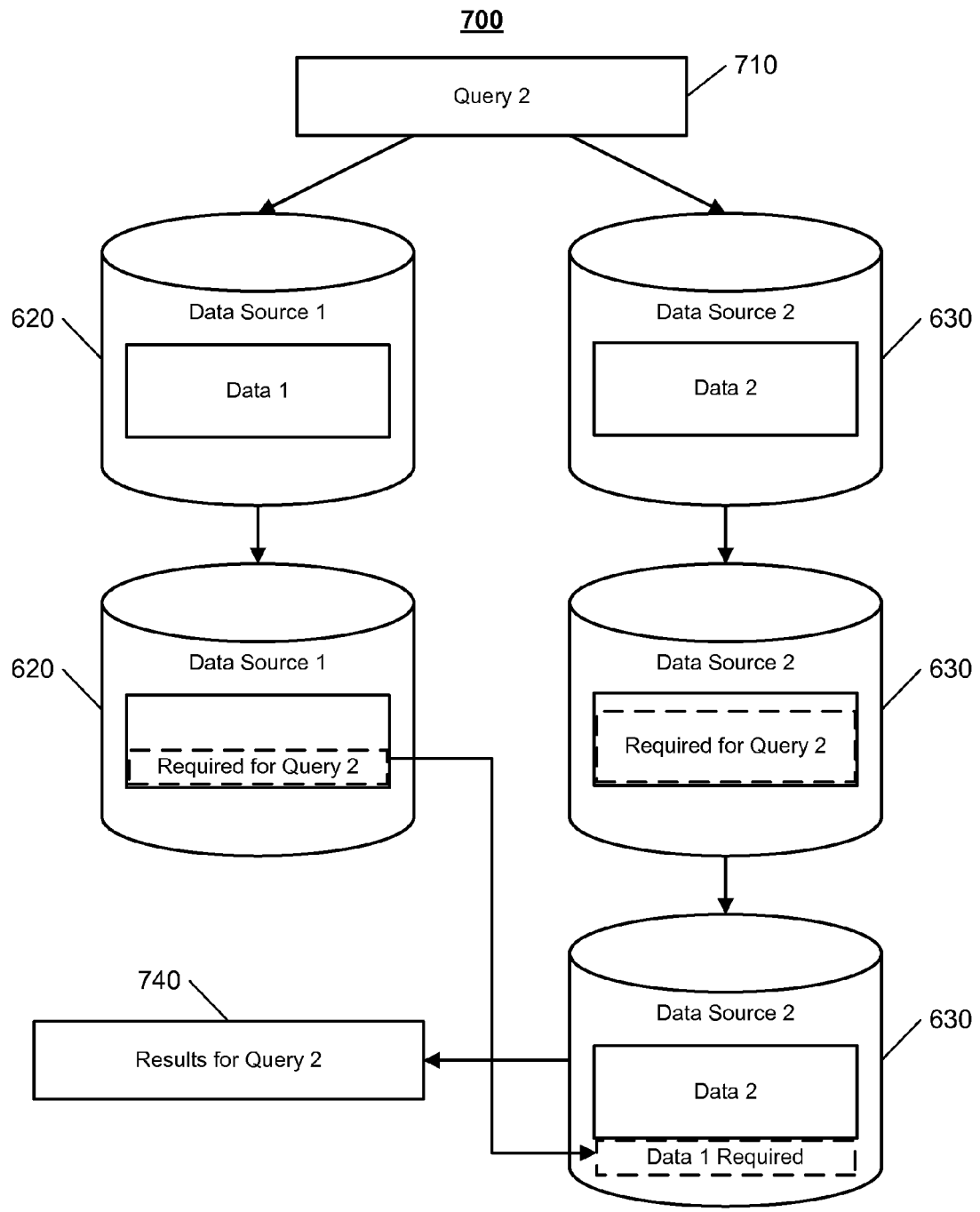

FIG. 7 illustrates an example 700 for handling a second query using the process 500. The system 200 receives a second query 710 that is different than the first query described above with respect to FIG. 6. In the example 700, the second query requires searching of a first data source 620 and a second data source 630.

When the system 200 receives the second query, the system 200 determines that the second query requires data from the first data source 620 and the second data source 630. In response to determining that the second query requires data from the first data source 620 and the second data source 630, the system 200 determines a first size of the data needed from the first data source 620 and a second size of the data needed from the second data source 630. In this example, the system 200 compares the first size to the second size and determines that the size of the data needed from the first data source 620 is less than the size of the data needed from the second data source 630.

In response to the determination that the size of the data needed from the first data source 620 is less than the size of the data needed from the second data source 630, the system 200 determines to join the data needed for satisfaction of the first query in the second data source 630. Accordingly, the system moves the data needed from the first data source 620 to the second data source 630.

After moving the data needed from the first data source 620 to the second data source 630, the system 200 joins the moved data from the first data source 620 with the data needed from the second data source 630. In joining the data in the second data source 630, the system 200 may create a new database table in the second data source 630 that includes a combination of the data needed from the first data source 620 and the data needed from the second data source 630.

After joining the data in the second data source 630, the system 200 executes the second query against the joined data in the second data source 630. Based on the execution of the second query, the system 200 provides results 740 of execution of the second query. The results may include a list of matching records and/or a report that includes statistical processing of data identified as matching the query. The system may display the results to a user using a graphical user interface, may store the results in electronic storage, and/or may send the results to the user in an electronic communication over a network (e.g., a report attached to an electronic mail message).

As shown by a comparison of FIGS. 6 and 7, the system 200 intelligently selects a primary source to use in joining data from multiple data sources in processing a query. The system 200 may select the primary data source as the data source that allows for the fastest execution of the query.

Figure 8:
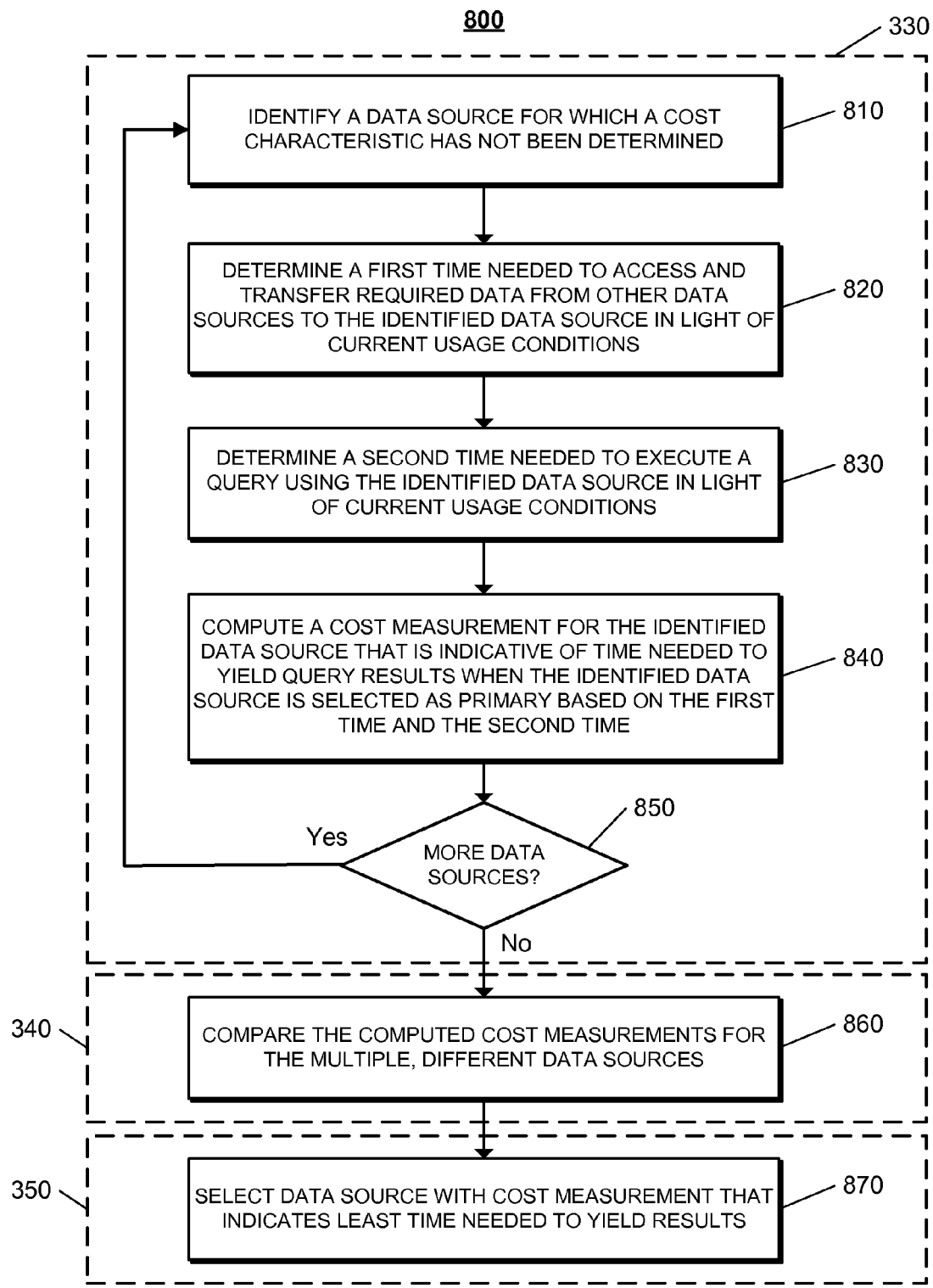

FIG. 8 illustrates an example process 800 for selecting a primary data source. The process 800 describes in additional detail some of the operations of the process 300 described above in reference to FIG. 3. For example, operations 810 through 850 described below may be used in determining a cost characteristic related to moving the identified data and executing the query referenced above with respect to reference numeral 330. Operation 860 may be used in comparing the determined cost characteristics referenced above with respect to reference numeral 340. Operation 870 described below may be used in selecting a primary data source referenced above with respect to reference numeral 350.

The operations of the process 800 are described generally as being performed by the system 200. The operations of the process 800 may be performed one of the components of the system 200 or may be performed by a combination of the components of the system 200. In some implementations, operations of the process 800 may be performed by one or more processors included in one or more electronic devices.

The system 200 identifies a data source for which a cost characteristic has not been determined (810). For instance, the system 200 analyzes the query to identify the data sources that store data needed for execution of the query and selects one of the identified data sources for which a cost characteristic has not been determined.

The system 200 determines a first time needed to access and transfer required data from other data sources to the identified data source in light of current usage conditions (820). For each of the other data sources, the system 200 may estimate a data access rate for a particular data source, determine an amount of data needed from the particular data source, and estimate a data transmission rate for transmitting data from the particular data source to the identified data source for which the cost characteristic is being determined. The system 200 then may compute a data access time for the particular data source using the estimated data access rate and the determined amount of data and compute a data transmission time for the particular data source using the estimated data transmission rate and the determined amount of data. The system 200 may sum the computed data access time and the computed data transmission time for all of the other data sources.

In estimating the data access rate and the data transmission rate, the system 200 may account for current usage conditions. For instance, the system 200 may determine a current load (e.g., a number of requests being handled) on a particular data source and estimate the data access rate based on the current load. In addition, the system 200 may determine a current bandwidth of transferring data from a particular data source to the identified data source for which the cost characteristic is being determined and estimate the data transmission rate based on the current bandwidth.

The system 200 determines a second time needed to execute a query using the identified data source in light of current usage conditions (830). For instance, the system 200 may estimate a processing speed of a system that executes queries against the identified data source and also determine the amount of data that needs to be processed in evaluating the query. The system 200 may compute the time needed to execute the query using the estimated processing speed and the determined amount of data.

In estimating the processing speed, the system 200 may account for current usage conditions. For instance, the system 200 may determine a current load (e.g., a number of requests being handled) on the identified data source and estimate the processing speed based on the current load.

The system 200 computes a cost measurement for the identified data source that is indicative of time needed to yield query results when the identified data source is selected as primary based on the first time and the second time (840). For example, the system 200 may add the first time and the second time to compute an estimated time to yield query results when the identified data source is selected as primary.

The system 200 determines whether more data sources exist that have data needed for satisfaction of the query and for which a cost measurement has not been computed (850). If more data sources do exist, the system 200 returns to operation 810 and repeats the operations 810 through 850 until a cost measurement has been computed for all of the data sources that have data needed for satisfaction of the query.

The system 200 compares the computed cost measurements for the multiple, different data sources (860). For example, the system 200 compares the estimated times to yield query results with each other to identify the data source having a shortest estimated time to yield query results. In this example, the system 200 may order the estimated times or search the estimated times to identify a shortest estimated time.

The system 200 selects a data source with a cost measurement that indicates least time needed to yield results (870). For instance, the system 200 selects the data source having the shortest estimated time to yield query results as the primary data source.

Figure 9:
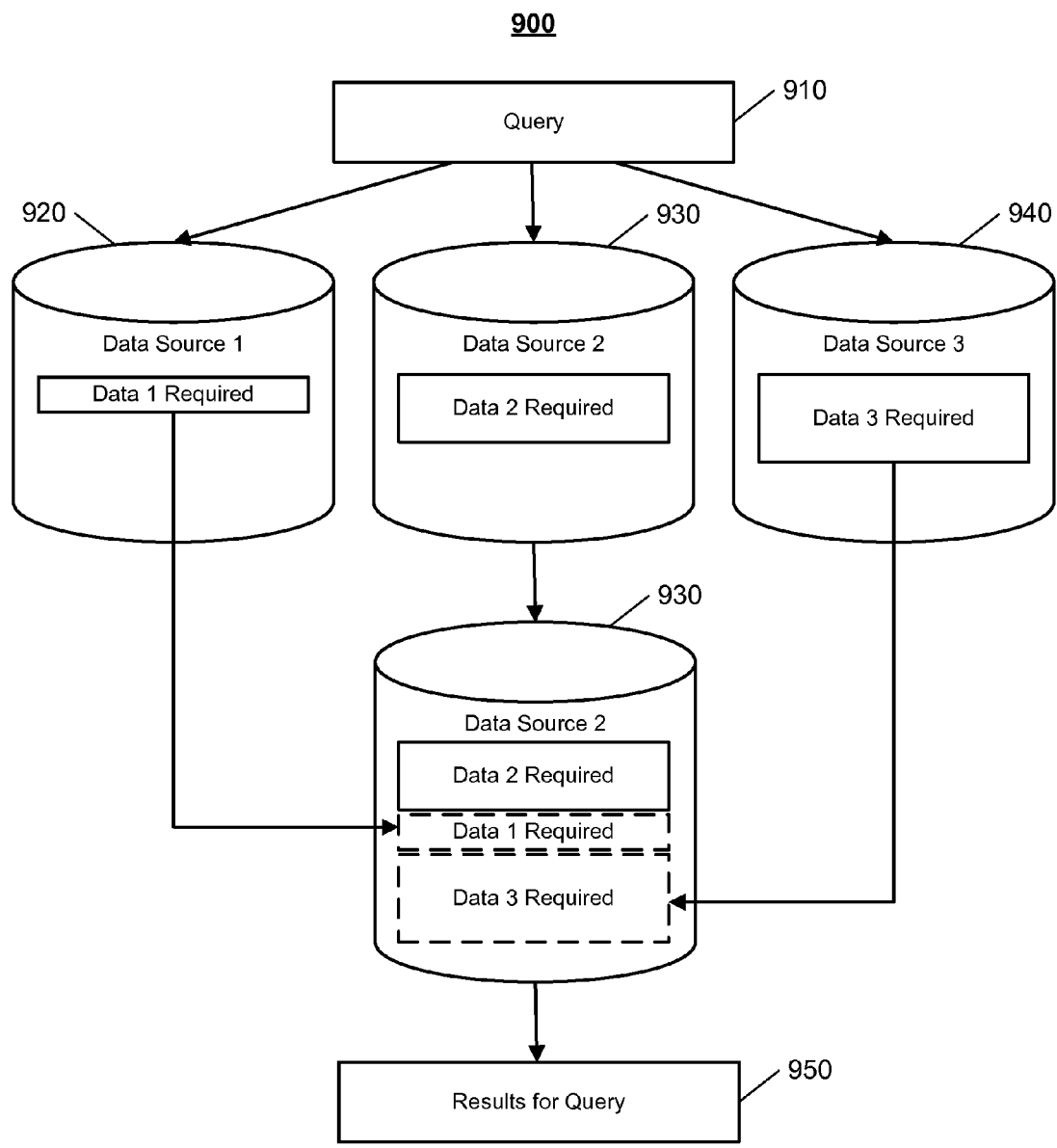

FIG. 9 illustrates an example 900 for handling a query using the process 800. The system 200 receives a query 910. In the example 900, the query requires searching of a first data source 920, a second data source 930, and a third data source 940.

When the system 200 receives the query, the system 200 determines that the query requires data from the first data source 920, the second data source 930, and the third data source 940. In response to determining that the query requires data from the first data source 920, the second data source 930, and the third data source 940, the system 200 determines a first cost measurement of using the first data source 920 as the primary data source, a second cost measurement of using the second data source 930 as the primary data source, and a third cost measurement of using the third data source 940 as the primary data source. The system 200 determines the first cost measurement based on a time needed to access and transfer required data from the second and third data sources to the first data source in light of current usage conditions and a time needed to execute the query using the first data source in light of current usage conditions. The system 200 determines the second cost measurement based on a time needed to access and transfer required data from the first and third data sources to the second data source in light of current usage conditions and a time needed to execute the query using the second data source in light of current usage conditions. The system 200 determines the third cost measurement based on a time needed to access and transfer required data from the first and second data sources to the third data source in light of current usage conditions and a time needed to execute the query using the third data source in light of current usage conditions.

Then, the system 200 compares the first cost measurement, the second cost measurement, and the third cost measurement to determine which cost measurement indicates a shortest time needed to yield query results. In this example, the system 200 determines, based on the comparison, that the second cost measurement indicates a shortest time needed to yield query results. Accordingly, the system 200 selects the second data source 930 as the primary data source, even though the third data source 940 stores a larger amount of data needed for execution of the query.

In response to the selection of the second data source 930 as the primary data source, the system 200 determines to join the data needed for satisfaction of the query in the second data source 930. Accordingly, the system 200 moves the data needed from the first data source 920 and the data needed from the third data source 940 to the second data source 930.

After moving the data needed from the first data source 920 and the data needed from the third data source 940 to the second data source 930, the system 200 joins the moved data from the first data source 920 and the third data source 940 with the data needed from the second data source 930. In joining the data in the second data source 930, the system 200 may create a new database table in the second data source 930 that includes a combination of the data needed from the first data source 920, the data needed from the second data source 930, and the data needed from the third data source 940.

After joining the data in the second data source 930, the system 200 executes the query against the joined data in the second data source 930. Based on the execution of the query, the system 200 provides results 950 of execution of the query. The results may include a list of matching records and/or a report that includes statistical processing of data identified as matching the query. The system may display the results to a user using a graphical user interface, may store the results in electronic storage, and/or may send the results to the user in an electronic communication over a network (e.g., a report attached to an electronic mail message).

Because the system 200 intelligently selected the data source to use as the primary data source, the system 200 may provide results for the query in the shortest amount of time. In addition, although using the size of the data needed from a data source to select the primary source provides a useful selection, the system 200 may use a combination of factors to determine the shortest time to yield query results to provide a more accurate selection that accounts for current usage conditions.

Figure 10:
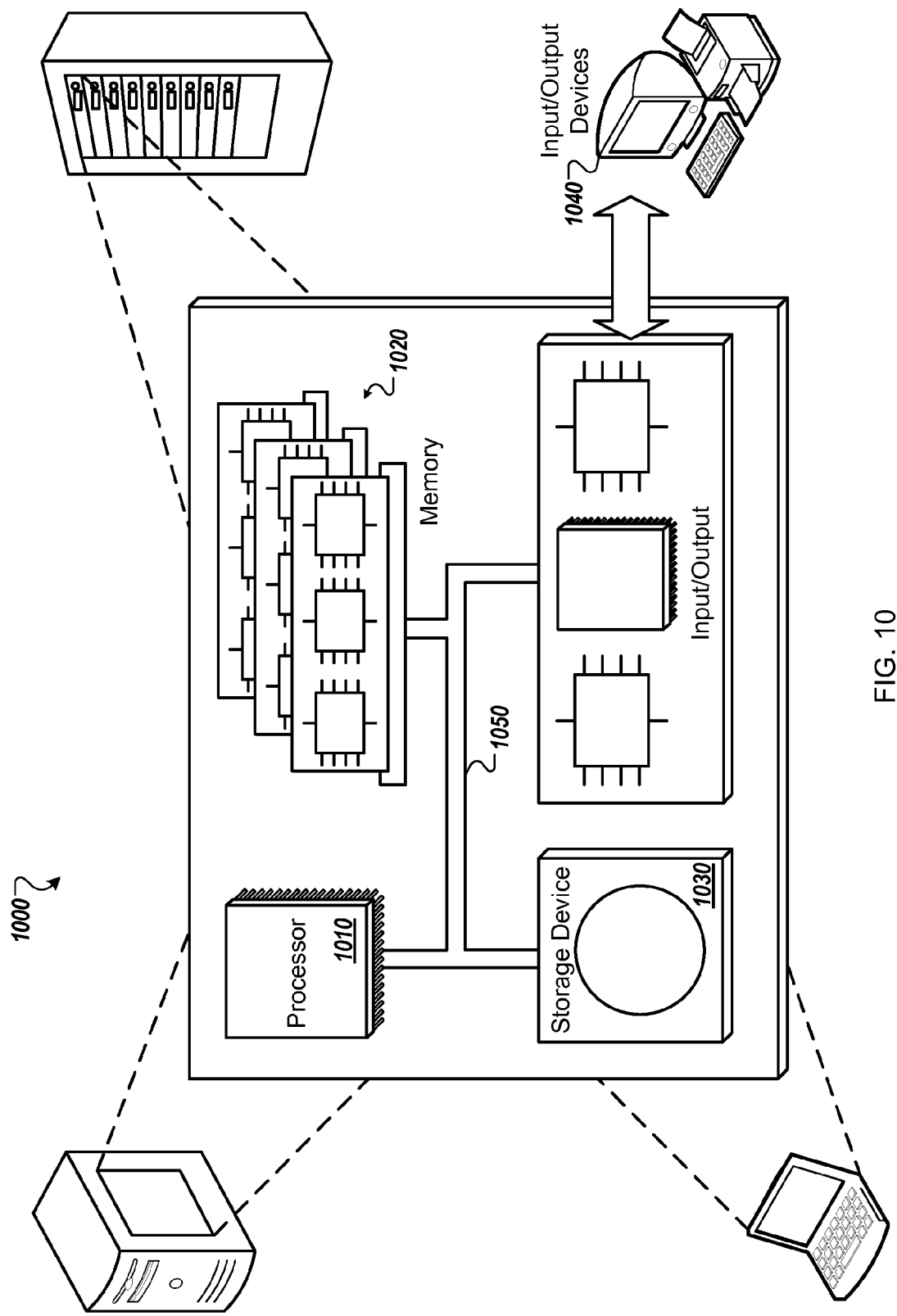

FIG. 10 is a schematic diagram of a generic computer system 1000. The system 1000 can be used for the operations described in association with any of the computer-implemented methods described previously. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable storage medium. In another implementation, the memory 1020 is a volatile memory unit. In yet another implementation, the memory 1020 is a non-volatile memory unit.

The storage device 1030 is capable of providing mass storage for the system 1000. In some implementations, the storage device 1030 is a computer-readable storage medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. An apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and a sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
   receiving a data request that is associated with a query that requires data from each of multiple, different data sources;
   identifying data required from each of the multiple, different data sources to satisfy the query;
   determining, for each of the multiple, different data sources, a cost characteristic related to moving, to a corresponding data source, the identified data required from the multiple, different data sources other than the corresponding data source and executing the query at the corresponding data source;
   comparing the determined cost characteristics with each other;
   based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;
   based on the selection of the primary data source, moving, into a table included in the primary data source, the identified data required from the multiple, different data sources other than the primary data source;
   subsequent to moving, into the table included in the primary data source, the identified data required from the multiple, different data sources other than the primary data source, executing the query against data included in the primary data source; and
   providing a response to the data request based on the execution of the query against data included in the primary data source;
   wherein the determining, for each of the multiple, different data sources, a cost characteristic related to moving, to the corresponding data source, the identified data required from the multiple, different data sources other than the corresponding data source and executing the query at the corresponding data source comprises:
      determining a first volume measurement of data required from a first data source to satisfy the query, and
      determining a second volume measurement of data required from a second data source to satisfy the query, the second data source being different than the first data source;
   wherein the comparing the determined cost characteristics with each other comprises comparing the first volume measurement with the second volume measurement; and
   wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises:
      when the comparison reveals that the first volume measurement is greater than the second volume measurement, selecting the first data source as the primary source to receive data from the second data source; and
      when the comparison reveals that the second volume measurement is greater than the first volume measurement, selecting the second data source as the primary source to receive data from the first data source.

2. The method of claim 1 wherein the determining, for each of the multiple, different data sources, a cost characteristic related to moving, to the corresponding data source, the identified data required from the multiple, different data sources other than the corresponding data source and executing the query at the corresponding data source comprises accounting for current usage of each of the multiple, different data sources in determining cost characteristics.

3. The method of claim 2 wherein the accounting for current usage of each of the multiple, different data sources in determining cost characteristics comprises accounting for current bandwidth and load of each of the multiple, different data sources in determining cost characteristics.

4. The method of claim 1 wherein the determining, for each of the multiple, different data sources, a cost characteristic related to moving, to the corresponding data source, the identified data required from the multiple, different data sources other than the corresponding data source and executing the query at the corresponding data source further comprises determining, for each of the multiple, different data sources, a cost characteristic based on monetary fees associated with moving, to the corresponding data source, the identified data required from the multiple, different data sources other than the corresponding data source and executing the query at the corresponding data source.

5. The method of claim 1 further comprising, subsequent to executing the query against data included in the primary data source, deleting, from the primary data source, the identified data required from the multiple, different data sources other than the primary data source that was moved into the table included in the primary data source.

6. The method of claim 5:
wherein the moving, into the table included in the primary data source, the identified data required from the multiple, different data sources other than the primary data source comprises creating the table in the primary data source based on the selection of the primary data source; and
wherein the deleting, from the primary data source, the identified data required from the multiple, different data sources other than the primary data source that was moved into the table included in the primary data source comprises deleting the table created in the primary data source.

7. The method of claim 1 wherein the executing the query against data included in the primary data source comprises analyzing the query only against physical data storage of the primary data source.

8. The method of claim 1 wherein the executing the query against data included in the primary data source comprises analyzing the query against physical data storage of the primary data source without analyzing the query against physical data storage of any of the multiple, different data sources other than the primary data source.

9. The method of claim 1 wherein the moving, into the table included in the primary data source, the identified data required from the multiple, different data sources other than the primary data source comprises joining, in the primary data source, the identified data required from the multiple, different data sources other than the primary data source with the identified data required from the primary data source.

10. The method of claim 1 wherein the receiving the data request that is associated with the query that requires data from each of multiple, different data sources comprises receiving a data request that is associated with a query that requires data from each of multiple, physically independent data sources that are located remotely from one another.

11. The method of claim 1 wherein the receiving the data request that is associated with the query that requires data from each of multiple, different data sources comprises receiving a query that requires data from each of multiple, different data sources.

12. The method of claim 1 wherein the receiving the data request that is associated with the query that requires data from each of multiple, different data sources comprises receiving a report generation request that requires execution of a query that requires data from each of multiple, different data sources to gather data required to generate the report.

13. A computer-implemented method comprising:
receiving a data request that is associated with a query that requires data from each of multiple, different data sources;
identifying data required from each of the multiple, different data sources to satisfy the query;
determining, for each of the multiple, different data sources, a cost characteristic related to moving, to a corresponding data source, the identified data required from the multiple, different data sources other than the corresponding data source and executing the query at the corresponding data source;
comparing the determined cost characteristics with each other;
based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;
based on the selection of the primary data source, moving, into a table included in the primary data source, the identified data required from the multiple, different data sources other than the primary data source;
subsequent to moving, into the table included in the primary data source, the identified data required from the multiple, different data sources other than the primary data source, executing the query against data included in the primary data source; and
providing a response to the data request based on the execution of the query against data included in the primary data source;
wherein the determining, for each of the multiple, different data sources, a cost characteristic related to moving, to the corresponding data source, the identified data required from the multiple, different data sources other than the corresponding data source and executing the query at the corresponding data source comprises:
determining whether data required from a first data source to satisfy the query is stored in a temporary table, and
determining whether data required from a second data source to satisfy the query is stored in a temporary table, the second data source being different than the first data source;
wherein the comparing the determined cost characteristics with each other comprises comparing the determination of whether data required from the first data source to satisfy the query is stored in a temporary table with the determination of whether data required from the second data source to satisfy the query is stored in a temporary table; and
wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises:
when the comparison reveals that the data required from the first data source to satisfy the query is not stored in a temporary table and the data required from the second data source to satisfy the query is stored in a temporary table, selecting the first data source as the primary source to receive data from the second data source; and when the comparison reveals that the data required from the second data source to satisfy the query is not stored in a temporary table and the data required from the first data source to satisfy the query is stored in a temporary table, selecting the second data source as the primary source to receive data from the first data source.

14. A computer-implemented method comprising:

receiving a data request that is associated with a query that requires data from each of multiple, different data sources;

identifying data required from each of the multiple, different data sources to satisfy the query;

determining, for each of the multiple, different data sources, a cost characteristic related to moving, to a corresponding data source, the identified data required from the multiple, different data sources other than the corresponding data source and executing the query at the corresponding data source;

comparing the determined cost characteristics with each other;

based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;

based on the selection of the primary data source, moving, into a table included in the primary data source, the identified data required from the multiple, different data sources other than the primary data source;

subsequent to moving, into the table included in the primary data source, the identified data required from the multiple, different data sources other than the primary data source, executing the query against data included in the primary data source; and providing a response to the data request based on the execution of the query against data included in the primary data source;

wherein the determining, for each of the multiple, different data sources, a cost characteristic related to moving, to the corresponding data source, the identified data required from the multiple, different data sources other than the corresponding data source and executing the query at the corresponding data source comprises:
determining a first time period of existence of a first table including data required from a first data source to satisfy the query, and
determining a second time period of existence of a second table including data required from a second data source to satisfy the query, the second data source being different than the first data source;

wherein the comparing the determined cost characteristics with each other comprises comparing the first time period with the second time period; and wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises:

when the comparison reveals that the first time period is longer than the second time period, selecting the first data source as the primary source to receive data from the second data source; and when the comparison reveals that the second time period is longer than the first time period, selecting the second data source as the primary source to receive data from the first data source.

15. A computer-implemented method comprising:

receiving a data request that is associated with a query that requires data from each of multiple, different data sources;

identifying data required from each of the multiple, different data sources to satisfy the query;

determining, for each of the multiple, different data sources, a cost characteristic related to moving, to a corresponding data source, the identified data required from the multiple, different data sources other than the corresponding data source and executing the query at the corresponding data source;

comparing the determined cost characteristics with each other;

based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;

based on the selection of the primary data source, moving, into a table included in the primary data source, the identified data required from the multiple, different data sources other than the primary data source;

subsequent to moving, into the table included in the primary data source, the identified data required from the multiple, different data sources other than the primary data source, executing the query against data included in the primary data source; and providing a response to the data request based on the execution of the query against data included in the primary data source;

wherein the determining, for each of the multiple, different data sources, a cost characteristic related to moving, to the corresponding data source, the identified data required from the multiple, different data sources other than the corresponding data source and executing the query at the corresponding data source comprises determining, for each of the multiple, different data sources, a time needed to access and transfer the identified data required from the multiple, different data sources other than the corresponding data source;

wherein the comparing the determined cost characteristics with each other comprises comparing the determined times with each other; and wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises selecting, from among the multiple, different data sources, a primary data source that has lowest time needed to access and transfer the identified data required from the multiple, different data sources other than the primary data source.

16. A computer-implemented method comprising:

receiving a data request that is associated with a query that requires data from each of multiple, different data sources;

identifying data required from each of the multiple, different data sources to satisfy the query;

determining, for each of the multiple, different data sources, a cost characteristic related to moving, to a corresponding data source, the identified data required from the multiple, different data sources other than the corresponding data source and executing the query at the corresponding data source;

comparing the determined cost characteristics with each other;

based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;

based on the selection of the primary data source, moving, into a table included in the primary data source, the identified data required from the multiple, different data sources other than the primary data source;

subsequent to moving, into the table included in the primary data source, the identified data required from the multiple, different data sources other than the primary data source, executing the query against data included in the primary data source; and providing a response to the data request based on the execution of the query against data included in the primary data source;

wherein the determining, for each of the multiple, different data sources, a cost characteristic related to moving, to the corresponding data source, the identified data required from the multiple, different data sources other than the corresponding data source and executing the query at the corresponding data source comprises determining, for each of the multiple, different data sources, a time needed to execute the query using the corresponding data source;

wherein the comparing the determined cost characteristics with each other comprises comparing the determined times with each other; and wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises selecting, from among the multiple, different data sources, a primary data source that has lowest time needed to execute the query using the primary data source.

17. A computer-implemented method comprising:

receiving a data request that is associated with a query that requires data from each of multiple, different data sources;

identifying data required from each of the multiple, different data sources to satisfy query;

the determining, for each of the multiple, different data sources, a cost characteristic related to moving, to a corresponding data source, the identified data required from the multiple, different data sources other than the corresponding data source and executing the query at the corresponding data source;

comparing the determined cost characteristics with each other;

based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;

based on the selection of the primary data source, moving, into a table included in the primary data source, the identified data required from the multiple, different data sources other than the primary data source;

subsequent to moving, into the table included in the primary data source, the identified data required from the multiple, different data sources other than the primary data source, executing the query against data included in the primary data source; and providing a response to the data request based on the execution of the query against data included in the primary data source;

wherein the determining, for each of the multiple, different data sources, a cost characteristic related to moving, to the corresponding data source, the identified data required from the multiple, different data sources other than the corresponding data source and executing the query at the corresponding data source comprises:

determining, for each of the multiple, different data sources, a first time needed to access and transfer the identified data required from the multiple, different data sources other than the corresponding data source, determining, for each of the multiple, different data sources, a second time needed to execute the query using the corresponding data source, and computing, for each of the multiple, different data sources, a cost measurement for the identified data source that is indicative of time needed to yield query results when the identified data source is selected as primary based on the first time and the second time;

wherein the comparing the determined cost characteristics with each other comprises comparing the cost measurements with each other; and wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises selecting, from among the multiple, different data sources, a primary data source that has lowest time needed to yield query results when selected as primary.

18. A system comprising:

one or more computers; and a non-transitory computer-readable medium coupled to the one or more computers having instructions stored thereon which, when executed by the one or more computers, cause the one or more computers to perform operations comprising:

receiving a data request that is associated with a query that requires data from each of multiple, different data sources;

identifying data required from each of the multiple, different data sources to satisfy the query;

determining, for each of the multiple, different data sources, a cost characteristic related to moving, to a corresponding data source, the identified data required from the multiple, different data sources other than the corresponding data source and executing the query at the corresponding data source;
comparing the determined cost characteristics with each other;
based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;
based on the selection of the primary data source, moving, into a table included in the primary data source, the identified data required from the multiple, different data sources other than the primary data source;
subsequent to moving, into the table included in the primary data source, the identified data required from the multiple, different data sources other than the primary data source, executing the query against data included in the primary data source; and
providing a response to the data request based on the execution of the query against data included in the primary data source;
wherein the determining, for each of the multiple, different data sources, a cost characteristic related to moving, to the corresponding data source, the identified data required from the multiple, different data sources other than the corresponding data source and executing the query at the corresponding data source comprises:
determining a first volume measurement of data required from a first data source to satisfy the query, and
determining a second volume measurement of data required from a second data source to satisfy the query, the second data source being different than the first data source;
wherein the comparing the determined cost characteristics with each other comprises comparing the first volume measurement with the second volume measurement; and
wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises:
when the comparison reveals that the first volume measurement is greater than the second volume measurement, selecting the first data source as the primary source to receive data from the second data source; and
when the comparison reveals that the second volume measurement is greater than the first volume measurement, selecting the second data source as the primary source to receive data from the first data source.

19. A system comprising:
one or more computers; and
a non-transitory computer-readable medium coupled to the one or more computers having instructions stored thereon which, when executed by the one or more computers, cause the one or more computers to perform operations comprising:
receiving a data request that is associated with a query that requires data from each of multiple, different data sources;
identifying data required from each of the multiple, different data sources to satisfy the query;
determining, for each of the multiple, different data sources, a cost characteristic related to moving, to a corresponding data source, the identified data required from the multiple,
different data sources other than the corresponding data source and executing the query at the corresponding data source;
comparing the determined cost characteristics with each other;
based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;
based on the selection of the primary data source, moving, into a table included in the primary data source, the identified data required from the multiple, different data sources other than the primary data source;
subsequent to moving, into the table included in the primary data source, the identified data required from the multiple, different data sources other than the primary data source, executing the query against data included in the primary data source; and
providing a response to the data request based on the execution of the query against data included in the primary data source,
wherein the determining, for each of the multiple, different data sources, a cost characteristic related to moving, to the corresponding data source, the identified data required from the multiple, different data sources other than the corresponding data source and executing the query at the corresponding data source comprises:
determining whether data required from a first data source to satisfy the query is stored in a temporary table, and
determining whether data required from a second data source to satisfy the query is stored in a temporary table, the second data source being different than the first data source;
wherein the comparing the determined cost characteristics with each other comprises comparing the determination of whether data required from the first data source to satisfy the query is stored in a temporary table with the determination of whether data required from the second data source to satisfy the query is stored in a temporary table; and
wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises:
when the comparison reveals that the data required from the first data source to satisfy the query is not stored in a temporary table and the data required from the second data source to satisfy the query is stored in a temporary table, selecting the first data source as the primary source to receive data from the second data source; and
when the comparison reveals that the data required from the second data source to satisfy the query is not stored in a temporary table and the data required from the first data source to satisfy the query is stored in a temporary table, selecting the second data source as the primary source to receive data from the first data source.

20. A system comprising:
one or more computers; and
a non-transitory computer-readable medium coupled to the one or more computers having instructions stored thereon which, when executed by the one or more computers, cause the one or more computers to perform operations comprising:
receiving a data request that is associated with a query that requires data from each of multiple, different data sources;
identifying data required from each of the multiple, different data sources to satisfy the query;
determining, for each of the multiple, different data sources, a cost characteristic related to moving, to a corresponding data source, the identified data required from the multiple, different data sources other than the corresponding data source and executing the query at the corresponding data source;
comparing the determined cost characteristics with each other;
based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;
based on the selection of the primary data source, moving, into a table included in the primary data source, the identified data required from the multiple, different data sources other than the primary data source;
subsequent to moving, into the table included in the primary data source, the identified data required from the multiple, different data sources other than the primary data source, executing the query against data included in the primary data source; and
providing a response to the data request based on the execution of the query against data included in the primary data source,
wherein the determining, for each of the multiple, different data sources, a cost characteristic related to moving, to the corresponding data source, the identified data required from the multiple, different data sources other than the corresponding data source and executing the query at the corresponding data source comprises:
  determining a first time period of existence of a first table including data required from a first data source to satisfy the query, and
  determining a second time period of existence of a second table including data required from a second data source to satisfy the query, the second data source being different than the first data source;
wherein the comparing the determined cost characteristics with each other comprises comparing the first time period with the second time period; and
wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises:
  when the comparison reveals that the first time period is longer than the second time period, selecting the first data source as the primary source to receive data from the second data source; and
  when the comparison reveals that the second time period is longer than the first time period, selecting the second data source as the primary source to receive data from the first data source.

21. A system comprising:
one or more computers; and
a non-transitory computer-readable medium coupled to the one or more computers having instructions stored thereon which, when executed by the one or more computers, cause the one or more computers to perform operations comprising:
receiving a data request that is associated with a query that requires data from each of multiple, different data sources;
identifying data required from each of the multiple, different data sources to satisfy the query;
determining, for each of the multiple, different data sources, a cost characteristic related to moving, to a corresponding data source, the identified data required from the multiple, different data sources other than the corresponding data source and executing the query at the corresponding data source;
comparing the determined cost characteristics with each other;
based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;
based on the selection of the primary data source, moving, into a table included in the primary data source, the identified data required from the multiple, different data sources other than the primary data source;
subsequent to moving, into the table included in the primary data source, the identified data required from the multiple, different data sources other than the primary data source, executing the query against data included in the primary data source; and
providing a response to the data request based on the execution of the query against data included in the primary data source,
wherein the determining, for each of the multiple, different data sources, a cost characteristic related to moving, to the corresponding data source, the identified data required from the multiple, different data sources other than the corresponding data source and executing the query at the corresponding data source comprises determining, for each of the multiple, different data sources, a time needed to access and transfer the identified data required from the multiple, different data sources other than the corresponding data source;
wherein the comparing the determined cost characteristics with each other comprises comparing the determined times with each other; and
wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises selecting, from among the multiple, different data sources, a primary data source that has lowest time needed to access and transfer the identified data required from the multiple, different data sources other than the primary data source.

22. A system comprising:

one or more computers; and a non-transitory computer-readable medium coupled to the one or more computers having instructions stored thereon which, when executed by the one or more computers, cause the one or more computers to perform operations comprising:

receiving a data request that is associated with a query that requires data from each of multiple, different data sources;

identifying data required from each of the multiple, different data sources to satisfy the query;

determining, for each of the multiple, different data sources, a cost characteristic related to moving, to a corresponding data source, the identified data required from the multiple, different data sources other than the corresponding data source and executing the query at the corresponding data source;

comparing the determined cost characteristics with each other;

based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;

based on the selection of the primary data source, moving, into a table included in the primary data source, the identified data required from the multiple, different data sources other than the primary data source;

subsequent to moving, into the table included in the primary data source, the identified data required from the multiple, different data sources other than the primary data source, executing the query against data included in the primary data source; and providing a response to the data request based on the execution of the query against data included in the primary data source, wherein the determining, for each of the multiple, different data sources, a cost characteristic related to moving, to the corresponding data source, the identified data required from the multiple, different data sources other than the corresponding data source and executing the query at the corresponding data source comprises determining, for each of the multiple, different data sources, a time needed to execute the query using the corresponding data source;

wherein the comparing the determined cost characteristics with each other comprises comparing the determined times with each other; and wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises selecting, from among the multiple, different data sources, a primary data source that has lowest time needed to execute the query using the primary data source.

23. A system comprising:

One or more computers; and a non-transitory computer-readable medium coupled to the one or more computers having instructions stored thereon which, when executed by the one or more computers, cause the one or more computers to perform operations comprising:

receiving a data request that is associated with a query that requires data from each of multiple, different data sources;

identifying data required from each of the multiple, different data sources to satisfy the query;

determining, for each of the multiple, different data sources, a cost characteristic related to moving, to a corresponding data source, the identified data required from the multiple, different data sources other than the corresponding data source and executing the query at the corresponding data source;

comparing the determined cost characteristics with each other;

based on comparison results, selecting, from among the multiple, different data sources, a primary data source that is associated with the determined cost characteristic that indicates lowest cost of moving, to the primary data source, the identified data required from the multiple, different data sources other than the primary data source and executing the query at the primary data source;

based on the selection of the primary data source, moving, into a table included in the primary data source, the identified data required from the multiple, different data sources other than the primary data source;

subsequent to moving, into the table included in the primary data source, the identified data required from the multiple, different data sources other than the primary data source, executing the query against data included in the primary data source; and providing a response to the data request based on the execution of the query against data included in the primary data source, wherein the determining, for each of the multiple, different data sources, a cost characteristic related to moving, to the corresponding data source, the identified data required from the multiple, different data sources other than the corresponding data source and executing the query at the corresponding data source comprises:

determining, for each of the multiple, different data sources, a first time needed to access and transfer the identified data required from the multiple, different data sources other than the corresponding data source, determining, for each of the multiple, different data sources, a second time needed to execute the query using the corresponding data source, and computing, for each of the multiple, different data sources, a cost measurement for the identified data source that is indicative of time needed to yield query results when the identified data source is selected as primary based on the first time and the second time;

wherein the comparing the determined cost characteristics with each other comprises comparing the cost measurements with each other; and wherein the selecting, from among the multiple, different data sources, the primary data source that is associated with the determined cost characteristic that indicates lowest cost of moving, to the primary data source, the identified data required from the multiple, different data sources other than the primary data source and executing the query at the primary data source comprises selecting, from among the multiple, different data sources, a primary data source that has lowest time needed to yield query results when selected as primary.

* * * * *